(12) United States Patent
Paul

(10) Patent No.: US 6,442,022 B1
(45) Date of Patent: Aug. 27, 2002

(54) REPLACEABLE SCA DRIVE ADAPTER BOARD FOR A REMOVABLE DISC DRIVE CARRIER

(75) Inventor: Dieter Paul, Anaheim, CA (US)

(73) Assignee: StorCase Technology, Inc., Fountain Valley, CA (US)

( * ) Notice: Subject to any disclaimer, the term of this patent is extended or adjusted under 35 U.S.C. 154(b) by 0 days.

(21) Appl. No.: 09/556,804

(22) Filed: Apr. 25, 2000

(51) Int. Cl.[7] .............................. G06F 1/16; H05K 7/02
(52) U.S. Cl. ..................... 361/685; 361/730; 439/928.1
(58) Field of Search ................................. 361/685, 683, 361/684, 728, 730, 737; 439/928.1, 929, 928

(56) References Cited

U.S. PATENT DOCUMENTS

| | | | | |
|---|---|---|---|---|
| 5,650,910 A | * | 7/1997 | Winick et al. ............... | 361/683 |
| 5,689,401 A | * | 11/1997 | Shikano ....................... | 361/685 |
| 5,734,549 A | * | 3/1998 | Oura ........................... | 361/685 |
| 5,828,546 A | * | 10/1998 | Tirrell et al. ................. | 361/685 |
| 5,886,869 A | * | 3/1999 | Fussell et al. .............. | 361/685 |

* cited by examiner

Primary Examiner—Lynn D. Feild
(74) Attorney, Agent, or Firm—Morland C. Fischer

(57) ABSTRACT

A replaceable SCA drive adapter board detachably connected to the rear of a disc drive carrier that encloses a remote computer disc drive and is adapted to be removably received within a computer storage chassis. The SCA drive adapter board has a SCA drive interface connector mounted on one face thereof to be coupled to a complementary interface connector of the disc drive and an SCA backplane interface connector mounted on the opposite face to be coupled to a host computer via connectors at the backplane of the computer storage chassis to enable the disc drive to communicate with the host computer whenever the disc drive carrier is returned to the computer storage chassis. The SCA drive adapter board is quickly and easily removed from the disc drive carrier and replaced to reduce down time and repair as a consequence of the SCA backplane interface connector wearing out following many repetitive insertion/removal cycles of the disc drive carrier to and from the chassis.

7 Claims, 5 Drawing Sheets

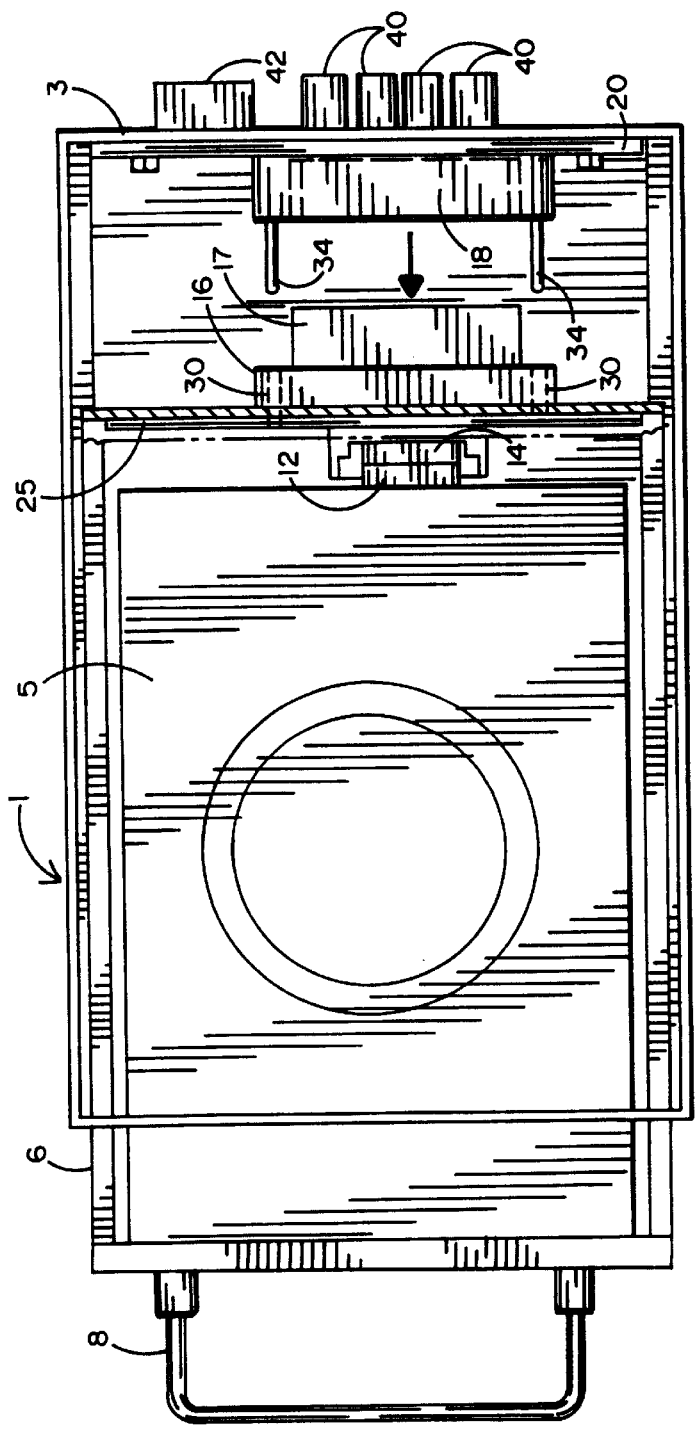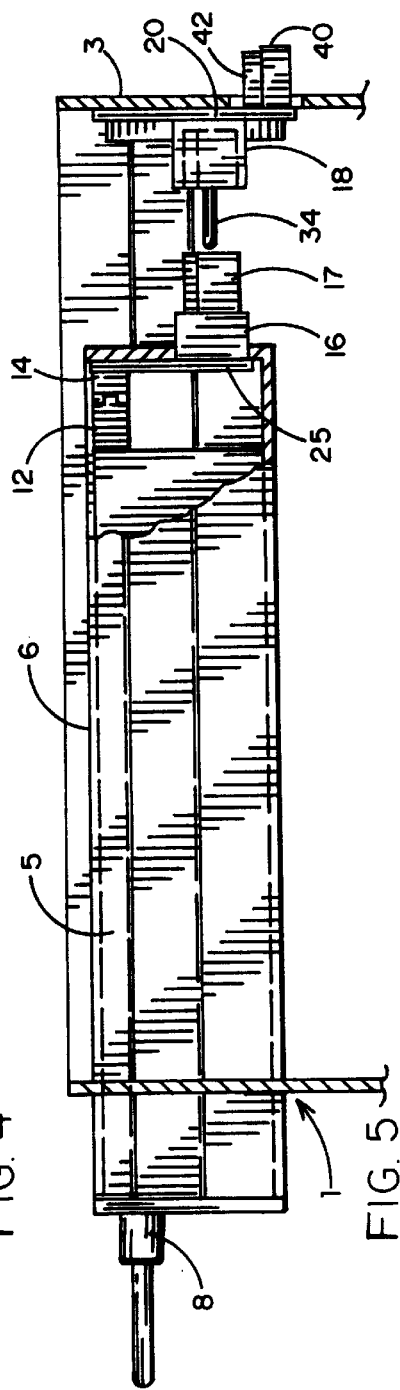

REPLACEABLE SCA DRIVE ADAPTER BOARD FOR A REMOVABLE DISC DRIVE CARRIER

BACKGROUND OF THE INVENTION

1. Field of the Invention

This invention relates to a replaceable SCA (single connector attachment) drive adapter board for use in a remote disk drive carrier that is removably received in a computer storage enclosure or chassis. The SCA drive adapter board may be quickly and easily replaced to minimize down time and repair to the disc drive carrier as a consequence of SCA drive interface connectors wearing out following many insertion/removable cycle of the carrier to and from the chassis.

2. Background Art

With the advent of personal computers and workstations, it is often necessary to remove the medium on which computer data is stored. For example, it may be desirable to remove a storage medium so as to be carried to a different site and/or to a different computer system. It may also be desirable to remove the storage medium to a secure location when the computer data stored thereon is particularly sensitive or secret. To accomplish the foregoing, computer storage media (e.g. disc drives) are affixed to carriers that are removably received within a storage enclosure or chassis that is located remotely from a host computer. The removable disc drive carrier is simply pulled out of its chassis on an as needed basis. Either the original disc drive carrier or a different carrier can be returned to the chassis. This insertion/removal cycle of the carrier usually occurs numerous times throughout the workday.

As will be known to those skilled in the art, each time that the disc drive carrier is inserted within its chassis, the disc drive affixed thereto must be electrically interconnected with a host computer by way of a plurality of interface connectors. In fact, ribbon cable commonly runs from a disc drive to terminate at a disc drive interface connector which must be mechanically coupled to a complementary disc drive interface connector within the carrier. As a consequence of the repetitive connect/disconnect cycles to which the disc drive interface connectors are subjected during the corresponding insertion/removable cycles of the disc drive carrier, one or both of the complementary (e.g. male and female) interface connectors wears out.

Accordingly, the removable carrier will experience down time whenever it is necessary to replace the disc drive interface connectors. Because of the large number of connect/disconnect cycles to which the interface connectors are subjected over time, the conventional removable carriers and the disc drives associated therewith are frequently out of service while awaiting repair. What is more, the ribbon cable used to electrically connect the disc drive to an interface connector within the carrier typically consumes a relatively large amount of space which increases the size requirements of the carrier.

SUMMARY OF THE INVENTION

A replaceable SCA (single connector attachment) drive adapter board is disclosed below to overcome the aforementioned inefficiencies associated with the short life expectancy that characterizes commonly used drive interface connectors so as to reduce the down time of the disc drive carriers with which the interface connectors are associated. The SCA drive adapter board is removably attached to the rear of the removable carrier within which a computer disc drive is affixed. A (e.g. female) SCA drive interface connector is mounted on a first face of the replaceable SCA drive adapter board. This drive interface connector on the adapter board is detachably coupled to a complementary male (e.g. male) SCA drive interface connector at the back of the disc drive. A (e.g. male) SCA backplane interface connector is mounted on the opposite face of the removable SCA drive adapter board. In the installed configuration, with the removal disc drive carrier returned to a chassis that is remote from a host computer, the backplane interface connector mounted on the adapter board is detachably inserted within a complementary (e.g. female) SCA backplane interface connector that is affixed to the backplane of the chassis and interconnected with the host computer via a plurality of host interface connectors. When the disc drive carrier is removed from its chassis, the male SCA backplane interface connector mounted on the replaceable SCA drive adapter board is pulled out of the female SCA backplane interface connector.

The detachable coupling between the complementary SCA drive interface connectors mounted on the first face of the replaceable SCA drive adapter board and on the disc drive eliminates the conventional use of long ribbon cable within the disc drive carrier. Thus, space consumption within the carrier will be advantageously reduced. In the event that the SCA backplane interface connector that is mounted on the opposite face of the replaceable drive adapter board should wear out as a consequence of undergoing repetitive connect/disconnect cycles with the complementary SCA backplane interface connector, the drive adapter board is simply removed from the rear of the disc drive carrier and discarded. A new SCA drive adapter board having fresh drive interface and backplane interface connectors at opposite faces thereof is quickly and easily returned to the disc drive carrier and coupled to the disc drive. Accordingly, the disc drive carrier is advantageously returned to service after only a short down time and with only minimal repair requirements (i.e. to remove and replace the SCA drive adapter board).

BRIEF DESCRIPTION OF THE DRAWINGS

FIG. 4 is a top view showing the removable disc drive carrier being withdrawn from the chassis;

FIG. 5 is a side view of the removable disc drive carrier shown in FIG. 4;

DETAILED DESCRIPTION

Figure 1:
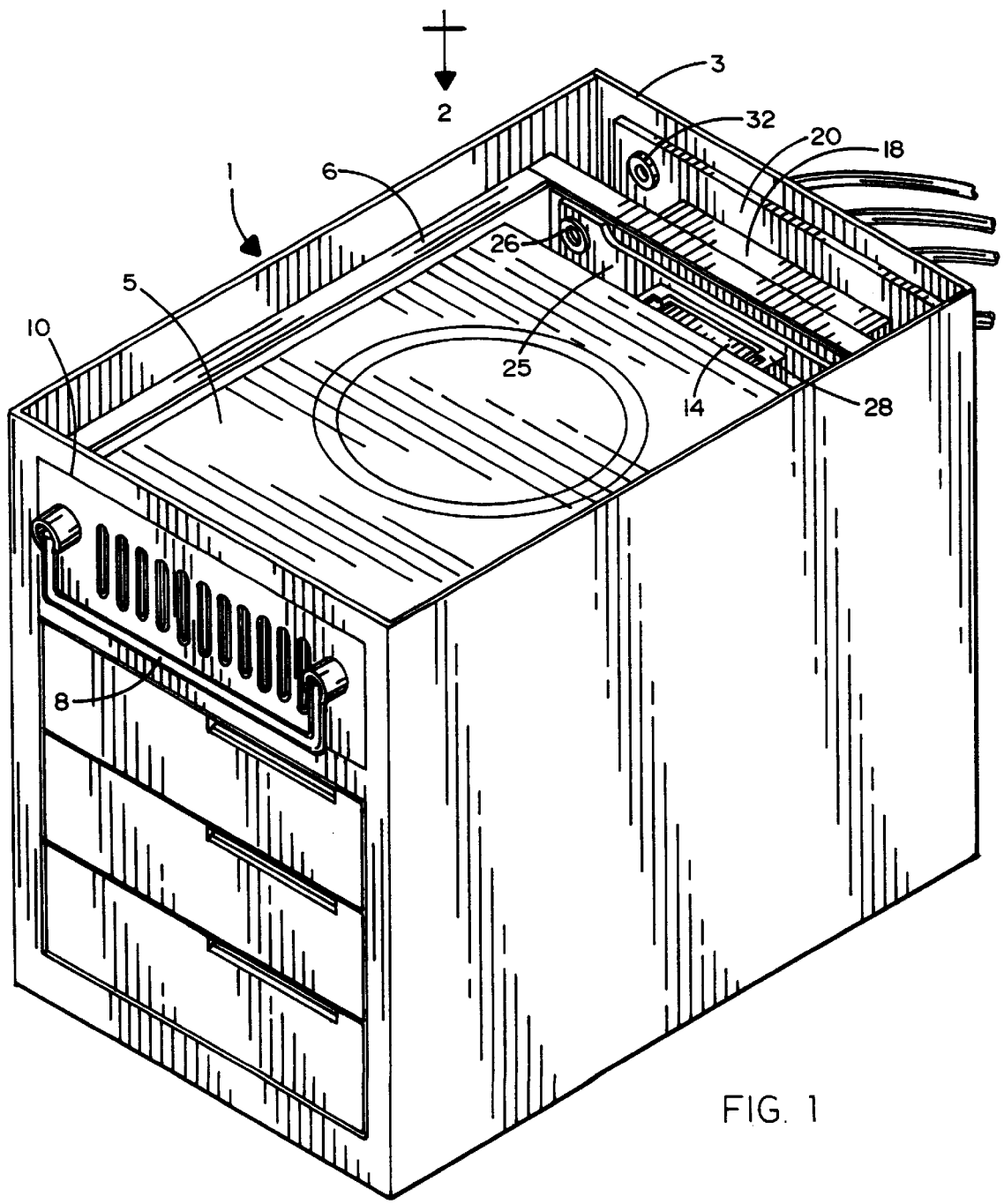
FIG. 1 shows a remote computer chassis within which is located a removable disc drive carrier to which the replaceable SCA drive adapter board which forms the present invention is removably attached.

Referring initially to FIGS. 1–5 of the drawings, the replaceable SCA (single connector attachment) drive adapter board (designated 25 and best illustrated in FIGS. 6–9) which forms the present invention will be better understood by first describing the environment in which the adapter board is used. To this end, FIG. 1 of the drawings shows a computer storage enclosure (i.e. a chassis 1) in which a plurality of remote computer drives are housed. That is to say, the chassis 1 in which the drives are housed is separated from its host computer. In the present example, the computer drives are disc drives (only one of which, designated 5, being shown). Each disc drive 5 is secured to a disc drive carrier 6 that is adapted to be removably received within the chassis 1 (best illustrated in FIGS. 4 and 5). A handle 8 to which a pulling force is applied is attached to each carrier 6 to enable the carrier to slide outwardly from the chassis 1 via a window 10 formed at the front thereof A male SCA drive interface connector 12 is mounted directly at the rear of the disc drive 5 of disc drive carrier 6 to be detachably connected to a complementary female drive interface connector 14. The drive interface connector 14 is, in turn, connected to a male SCA backplane interface connector 16 that is mounted at the rear of the removable disc drive carrier 6.

In the installed computer storage assembly, when the removable disc drive carrier 6 is slidably received within its chassis 1, the male backplane interface connector 16 at the rear of carrier 6 is detachably connected to a complementary female SCA backplane interface connector 18 that is associated with a backplane 20. In the present example, the backplane 20 is affixed to the inside face of the rear end 3 of chassis 1. However, it is to be understood that the backplane with which the backplane interface connector 18 is associated can also be a suitable printed circuit board on which computer interface circuitry is located.

Referring briefly to FIGS. 4 and 5 of the drawings, those skilled in the art will recognize that the disc drive carrier 6 which encloses the disc drive 5 is typically removed from (and returned to) the chassis I many time during each day. Accordingly, the male and female backplane interface connectors 16 and 18 are correspondingly detached from (and reconnected to) one another many times. As a consequence of the many connector/disconnect cycles to which the male and female backplane interface connectors 16 and 18 are subjected over time, the male backplane interface connector 16 is known to wear out. That is to say, while the male backplane interface connector 16 is preferably chosen to require a low insertion force (to be easily received by female connector 18) and be capable of withstanding a high cycle count, such backplane interface connector 16 is, from time-to-time, in need of replacement.

In accordance with the present improvement, the replaceable SCA drive adapter board 25 is provided to facilitate a quick, easy and efficient replacement of the male backplane interface connector 16 after it becomes worn out following the repetitive removal and return of disc drive carrier 6 to chassis 1 and a corresponding number of connect/disconnect cycles between the male SCA backplane interface connector 16 and the female SCA backplane interface connector 18. In this regard, and turning now to FIGS. 6–9 of the drawings, the replaceable SCA drive adapter board 25 is shown having the female SCA drive interface connector 14 mounted on a first face thereof and electrically interconnected with the male backplane interface connector 16 mounted on the opposite face.

Figure 2:
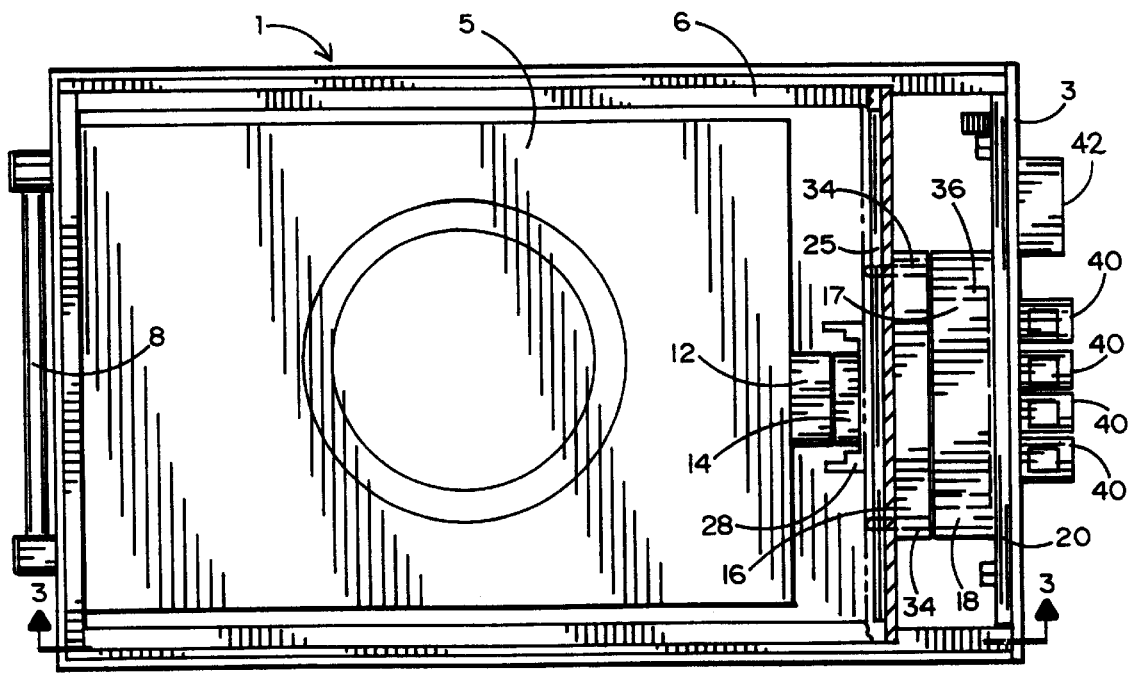
FIG. 2 is a cross-section of the remote computer chassis taken along lines 2—2 of FIG. 1.
Figure 3:
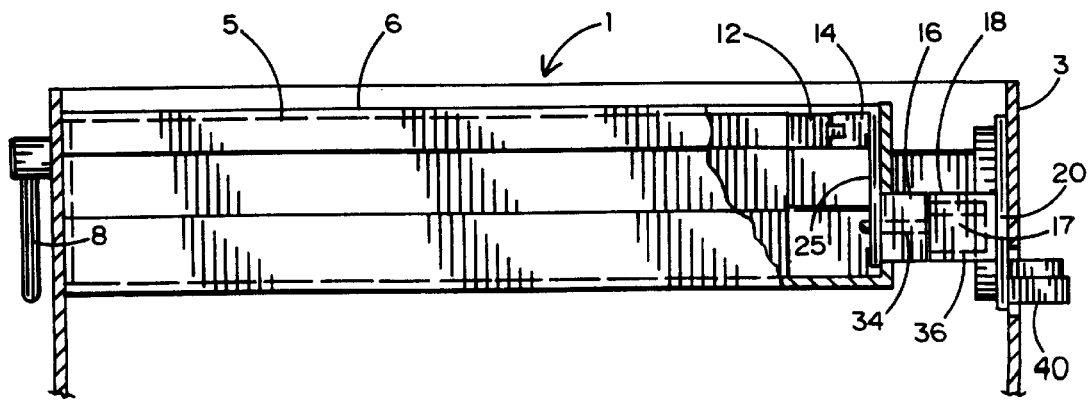
FIG. 3 is a side view taken along lines 3—3 of FIG. 2 showing the removable disc drive carrier within the chassis.
Figures 6, 7:
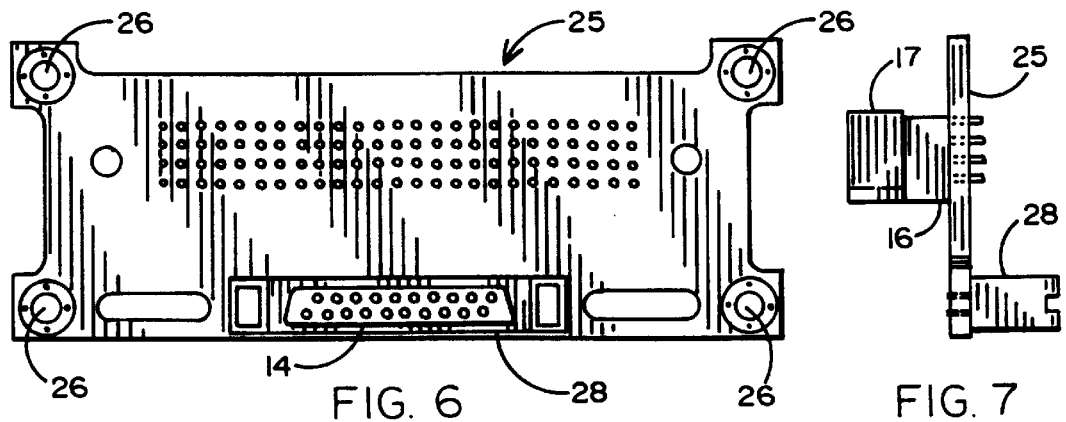
FIG. 6 shows one face of the replaceable SCA drive adapter board.
FIG. 7 is a side view of the replaceable SCA drive adapter board.
Figure 8:
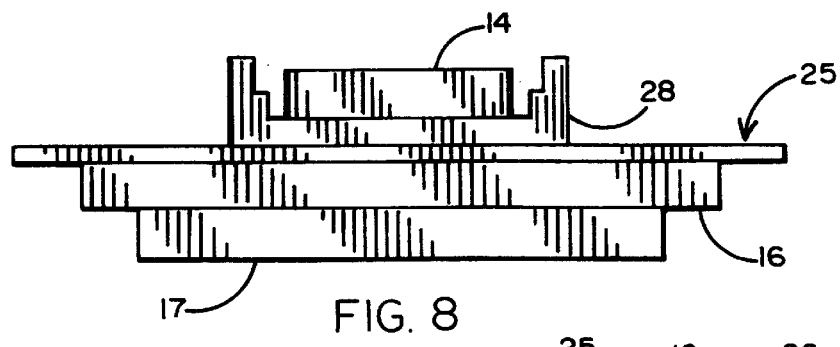
FIG. 8 is a top view of the replaceable drive adapter board.
Figure 9:
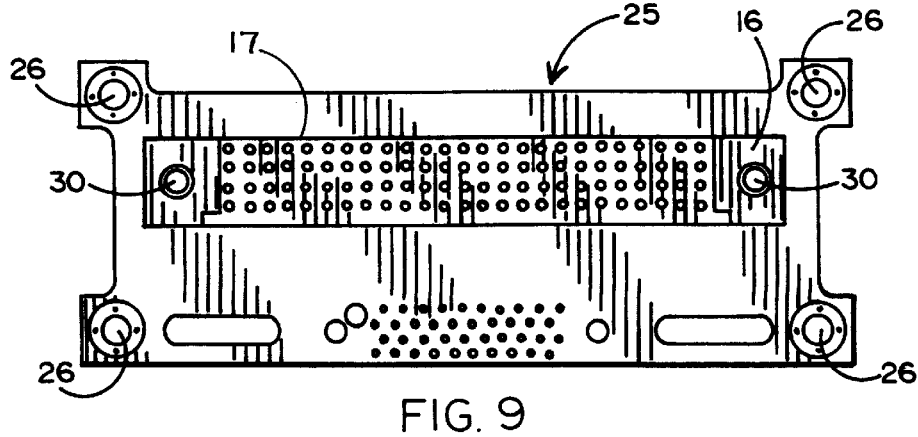
FIG. 9 shows the opposite face of the replaceable SCA drive adapter board of FIG. 6.
Figure 10:
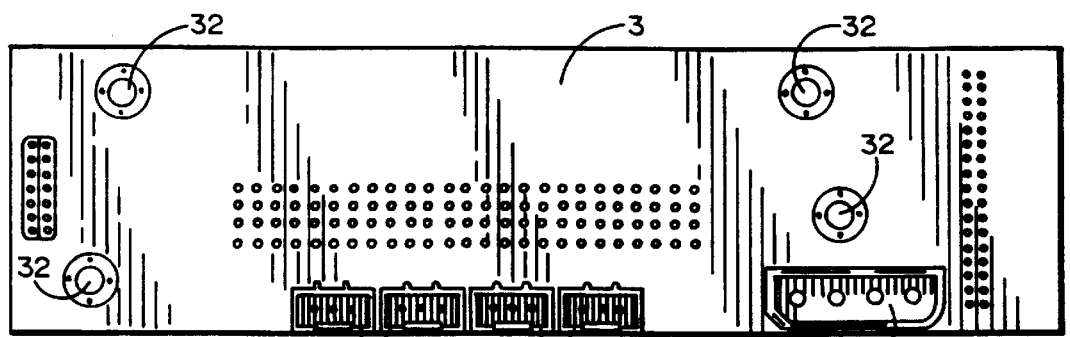
FIG. 10 shows the outside facing wall at the rear end of the chassis within which the disc drive carrier is removably received.
Figure 11:
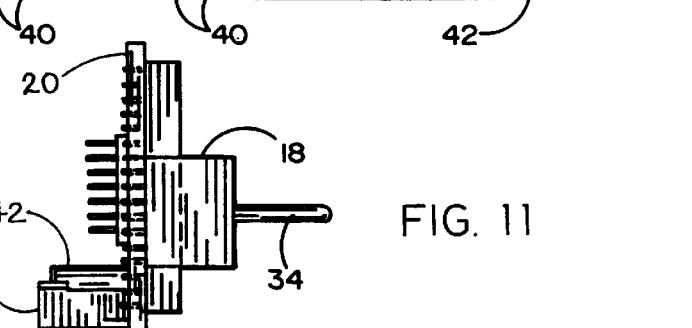
FIG. 11 is a side view of the rear end of the chassis.

The SCA adapter board 25 has a set of holes 26 formed at the corners to receive suitable fasteners by which to permit the adapter board to be attached to the rear of the disc drive carrier 6 (best shown in FIG. 2 and 3). In this same regard, the aforementioned fasteners also permit adapter board 25 to be removed from the disc drive carrier 6 when the male backplane interface connector 16 is in need of replacement after wearing out as a consequence of completing numerous connect/disconnect cycles with female backplane interface connector 18.

By virtue of this improvement, the replaceable SCA drive adapter board 25 having the drive interface connector 14 and the backplane interface connector 16 mounted on opposite faces thereof may be quickly and easily removed from the disc drive carrier 6 to be discarded and then replaced with a new drive adapter board having a fresh pair of interface connectors 14 and 16. The foregoing placement requires only minimal downtime for the disc drive carrier 6 while avoiding the rewiring and repair that have heretofor been associated with removable disc drive carriers having conventional SCA interface connectors detachably connected one to another. What is more, the addition of the removable SCA drive adapter board 25 as herein disclosed eliminates the space consuming ribbon cable and connectors that are common to conventional removable disc drive carriers.

Figure 12:
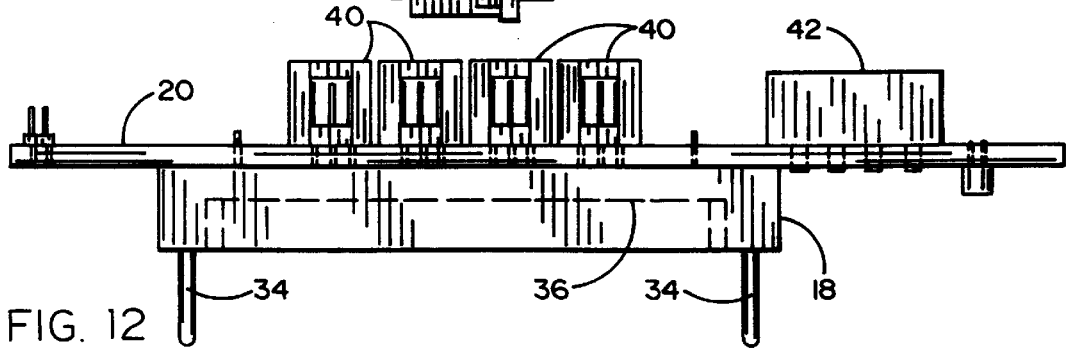
FIG. 12 is a top view of the rear end of the chassis showing the back plane thereof.

The replaceable SCA drive adapter board 25 shown in FIG. 6–9 includes a connector alignment guide 28 surrounding the female drive interface connector 14. Female interface connector 14 is positioned on the first face of the adapter board 25 so as to be aligned with and mated to the male interface connector 12 at the rear of the disc drive 5. The male backplane interface connector 16 at the opposite face of adapter board 25 is positioned so that the outwardly projecting terminal block 17 thereof is aligned for insertion within an opposing cavity (designated 36 and best shown in FIG. 12) of the female backplane interface connector 18 that is affixed to the backplane 20 at the inside face of the rear end 3 of chassis 1. A pair of pin receptacles 30 are formed at opposite ends of the backplane interface connector 16 in order to slidably receive respective guide pins (designated 34 and also best shown in FIG. 12) which project outwardly from the female backplane interface connector 18.

Figure 13:
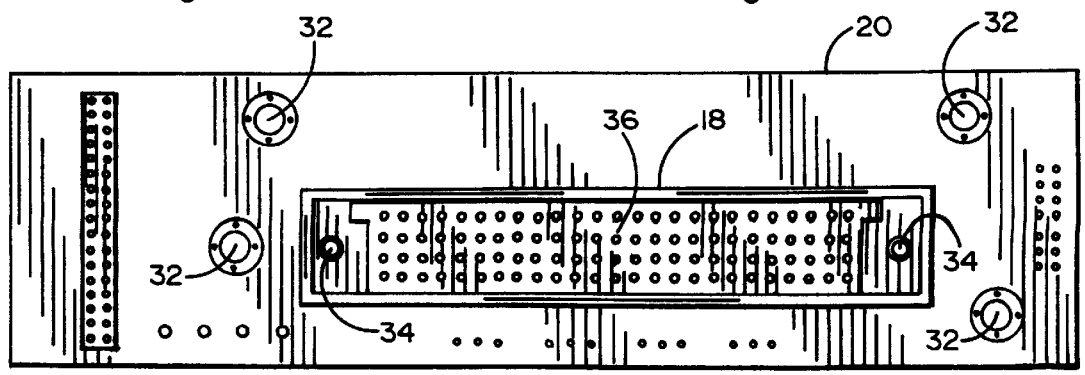
FIG. 13 shows the inside facing wall at the rear end of the chassis.

Details of the backplane 20 and the SCA interface connectors at the rear end wall 3 of chassis 1 are disclosed while referring to FIGS. 10–13 of the drawing. As described above, the backplane 20 is affixed to the inside face of the rear end 3 of chassis 1. As is best shown in FIG. 13, a series of holes 32 are formed in the backplane 20 to receive suitable fasteners by which the backplane 20 is affixed to the rear end 3. The female SCA backplane interface connector 18 is positioned on the backplane 20 so as to be aligned with and mated to the male SCA backplane interface connector 16 of the SCA drive adapter board 25.

Projecting outwardly from opposite ends of the female backplane interface connector 18 are the pair of guide pins 34. The aforementioned cavity 36 is recessed within the backplane interface connector 18. In the installed computer storage configuration illustrated in FIGS. 2 and 3, with the drive adapter board 25 affixed to the rear of the disc drive carrier 6, the outwardly projecting terminal block 17 of the male backplane interface connector 16 is removably received within the cavity 36 of the female backplane interface connector 18 at the same time that the guide pins 34 of female backplane interface connector 18 are slidably received by respective pin receptacles 30 (best shown in FIG. 9) in the male backplane interface connector 16.

Located on the outside face of the rear end 3 of chassis 1 in which the disc drive carrier 6 is removably received are a plurality of host interface connectors 40. The host interface connectors 40 are mated to the male SCA backplane interface connector 16 through backplane 20 when the terminal block 17 of male SCA backplane interface connector 16 is received within the cavity 36 of the female SCA backplane interface connector 18. Host interface connectors 40 are connected (e.g. by means of wires) to the drive controllers of the host computer (not shown). Such drive controllers may include a RAID controller, and the like. The usual power connector 42 is also located outside the rear end 3 of chassis 1.

It may now be appreciated that.by virtue of the replaceable SCA drive adapter board 25 of the present invention, a remote disc drive within a removable disc drive carrier can be interconnected with a host computer with the carrier being repeatedly removed from and returned to a computer storage enclosure while maintaining the SCA coupling connectors in working order without requiring time consuming and inefficient repairs like those that have been experienced by removable disc drive carriers in the past. Moreover, the detachable coupling between the female SCA drive interface connector 14 on one face of the drive adapter board 25 and the male SCA drive interface connector 12 of the disc drive eliminates the conventional use of long, space consuming ribbon cable within the disc drive carrier.

I claim:

1. In combination:
   a computer drive carrier enclosing a computer drive, said computer drive having a drive interface connector;
   a computer storage chassis having front, rear and side walls, an opening through said front wall for removably receiving said computer drive carrier, and a plurality of electrical connectors at the rear wall by which the computer drive enclosed by said computer drive carrier is connected to a host computer; and
   a replaceable drive adapter board detachably connected to said computer drive carrier and having electrical connector means by which to enable said computer drive to communicate with the host computer, said electrical connector means including a complementary drive interface connector to be mated to the drive interface connector of said computer drive and a backplane interface connector to be mated to one of said plurality of electrical connectors at the rear wall of said computer storage chassis, said replaceable drive adapter board being removable from said computer drive carrier when said electrical connector means thereof are in need of replacement.

2. The combination recited in claim 1, wherein said replaceable drive adapter board has first and opposite faces, said complimentary drive interface connector being mounted on said first face and said backplane interface connector communicating with said complementary drive interface connector and being mounted on said opposite face.

3. The combination recited in claim 2, wherein said computer drive carrier has front, rear and side walls, said replaceable drive adapter board being detachably connected to the rear wall of said computer drive carrier so that said backplane interface connector on the opposite face of said replaceable drive adapter board is aligned with the one of said plurality of electrical connectors at the rear wall of said computer storage chassis.

4. The combination recited in claim 3, wherein the backplane interface connector mounted on the opposite face of said replaceable drive adapter board is a male SCA backplane interface connector having an outwardly projecting terminal block.

5. The combination recited in claim 4, wherein the one of said plurality of electrical connectors at the rear wall of said computer storage chassis that is aligned with and mated to said male SCA backplane interface connector is a female SCA backplane interface connector having a cavity formed therein in which to removably receive the outwardly projecting terminal block of said male SCA backplane interface connector, said terminal block being pulled out of said cavity when said computer drive carrier is removed from said computer storage chassis.

6. The combination recited in claim 5, wherein said female SCA backplane interface connector is mounted on a backplane. of said computer storage chassis, said backplane affixed to the rear wall of said computer storage chassis.

7. A computer disc drive carrier adapted to be removably received within a computer storage chassis to which a backplane is affixed, said computer disc drive carrier comprising a computer disc drive to which an SCA drive interface connector is attached, a replaceable SCA drive adapter board including first and opposite faces, a complementary SCA drive interface connector mounted on said first face to be mated to the SCA drive interface connector of said computer disc drive, and an SCA backplane interface connector mounted on said opposite face to be interconnected with a host computer via the backplane of the computer storage chassis to enable the computer disc drive to communicate with the host computer, said replaceable SCA drive adapter board being removed from said computer disc drive carrier when said complementary SCA drive interface connector or said SCA backplane interface connector respectively mounted on said first and opposite faces thereof are in need of replacement.

* * * * *